United States Patent
Maanoja et al.

(10) Patent No.: US 7,069,023 B2
(45) Date of Patent: Jun. 27, 2006

(54) LOCATION SERVICES

(75) Inventors: Markus Maanoja, Helsinki (FI); Mikko Weckström, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/488,017

(22) PCT Filed: Aug. 28, 2002

(86) PCT No.: PCT/IB02/03798

§ 371 (c)(1), (2), (4) Date: Apr. 13, 2004

(87) PCT Pub. No.: WO03/024141

PCT Pub. Date: Mar. 20, 2003

(65) Prior Publication Data

US 2004/0259566 A1 Dec. 23, 2004

(30) Foreign Application Priority Data

Aug. 30, 2001 (GB) ................... 0121030.1

(51) Int. Cl.
*H04Q 7/00* (2006.01)

(52) U.S. Cl. .............. 455/456.1; 455/456.5; 455/404.2

(58) Field of Classification Search ........... 455/404.2, 455/456.6, 456.3, 456.2
See application file for complete search history.

(56) References Cited

U.S. PATENT DOCUMENTS

| | | | | | |
|---|---|---|---|---|---|
| 5,987,329 | A | * | 11/1999 | Yost et al. | 455/456.1 |
| 6,026,304 | A | * | 2/2000 | Hilsenrath et al. | 455/456.2 |
| 6,040,800 | A | * | 3/2000 | Raith et al. | 342/387 |
| 6,327,474 | B1 | * | 12/2001 | Ruutu et al. | 455/456.1 |
| 2004/0266457 | A1 | * | 12/2004 | Dupray | 455/456.5 |

FOREIGN PATENT DOCUMENTS

WO  WO 00/69199    11/2000
WO  WO 01/53848 A2  7/2001

* cited by examiner

*Primary Examiner*—William Trost
*Assistant Examiner*—Brandon J. Miller
(74) *Attorney, Agent, or Firm*—Squire, Sanders & Dempsey LLP (57) ABSTRACT

A method for calculating the location of a mobile user terminal in a wireless communication system, comprising the steps of: identifying a default sequence in which a plurality of location calculating methods should be executed to calculate said location; forming a new sequence by reordering said default sequence responsive to at least one system parameter; and executing at least one of said calculating methods in accordance with the new sequence to thereby calculate said location.

24 Claims, 6 Drawing Sheets

LOCATION SERVICES

The present invention relates to a method and apparatus for calculating the geographical location of a mobile user terminal. In particular, but not exclusively the present invention provides a way in which the efficiency of location resources in a communication system can be improved.

Various user equipment (UE) such as computers (fixed or portable), mobile telephones, personal data assistants or organisers and so on are known to the skilled person and these can be used to communicate with other user equipment in a communication system or to access the Internet to obtain services. Mobile user equipment is often referred to as a mobile station and can be defined as a means which is capable of communication via a wireless interface with a another device such as a base station of a mobile telecommunication network or any other station. Such a mobile user equipment can be adapted for voice, text message or data communication via the wireless interface.

It is also well known by the skilled person that it is useful to identify the location of UE. Currently there are many methods via which the geographical location of the UE can be established. Each of these methods has advantages and disadvantages in relation to one another. For example some methods calculate the UE location precisely but take a long time to do so. Other methods are quicker but are less accurate or require more processing powers.

A number of location estimating mechanisms are known for use with location services (LCS) in communication systems. Some of these are the time of arrival (TOA), enhanced observed time difference (E-OTD), observed time difference of arrival (OTDOA) and global positioning system (GPS positioning mechanism). Some of these and others will be described in more detail hereinafter. Through use of one of these methods the LCS provides means to locate a UE. The public land mobile network (PLMN) will thus provide a location application with a geographical location of the UE. The location application which uses this information may reside within the PLMN (in either the UE or in the network itself) or outside the PLMN (in an external application).

Positioning may be initiated either by the network, the UE or an external application. The role of the core-network nodes in relation to the LCS is to convey positioning requests towards a serving mobile location centre (SMLC) and location information towards the requesting gateway mobile location centre (GMLC). Furthermore the core-network nodes may identify events such as emergency call set-ups which will require initiation of positioning of a mobile station.

Due to the large variety of location calculating methods and the fact that the methods are constantly being developed a problem that has been encountered is that of establishing which specific location calculating method should be used to calculate the location at any one time.

In the past various solutions have been proposed to overcome this problem. For example the available location calculating methods have been executed in a fixed order. Alternatively the location calculating methods used have been selected based upon the quality of service required. In this respect quality of service (QoS) will be understood to broadly cover any aspect of the location calculating service provided by the location calculating resources in the communication system. For example the accuracy with which the location should be calculated or the time available to carry out the calculation before the location needs to be known. Thus if an accurate estimate of the UE location is required a location calculating method which provides this level of accuracy has been used.

However a problem with adopting any of the methods above mentioned is that often LCS resources are inefficiently used. For example where a location is required with a certain level of accuracy a location calculating method may be used which calculates the location with that level of accuracy but which takes longer or requires more processing power than other available methods which could also provides that level of accuracy. Also no account is taken of other system factors such as the time of day at which the location request is made. Also where functionality for carrying out the location calculations is distributed in various nodes of the communication system no account is taken of where spare capacity is available.

It is an aim of embodiments of the present invention to at least partly mitigate the above-mentioned problems.

According to a first aspect of the present invention there is provided a method for calculating the location of a mobile user terminal in a wireless communication system, comprising the steps of:

identifying a default sequence in which a plurality of location calculating methods should be executed to calculate said location;

forming a new sequence by reordering said default sequence responsive to at least one system parameter; and executing at least one of said calculating methods in accordance with the new sequence to thereby calculate said location.

According to a second aspect of the present invention there is provided an apparatus arranged to calculate the location of a mobile user terminal in a communication system comprising:

means to access a data store holding a plurality of calculating methods;

means for receiving a signal identifying at least one system parameter and in response thereto reordering an identified default sequence of said plurality of calculating methods to thereby form a new sequence; and means for executing at least one of said calculating methods in accordance with said new sequence to thereby calculate the location of the user terminal.

Embodiments of the present invention provide the advantage that resources can be efficiently used because the most time consuming location calculating methods are not used if not necessary.

By enabling the methods used to calculate the location of a UE to be dynamically selected embodiments of the present invention provide a system which can react rapidly to changes in the LCS resources and to other factors which might effect the efficiency with which the location is calculated.

As new location calculating methods are developed these can conveniently be introduced as options into the LCS resources.

For a better understanding of the present invention reference will now be made, by way of example only, to the accompanying drawings in which.

In the drawings like reference numerals refer to like parts.

Figure 1:
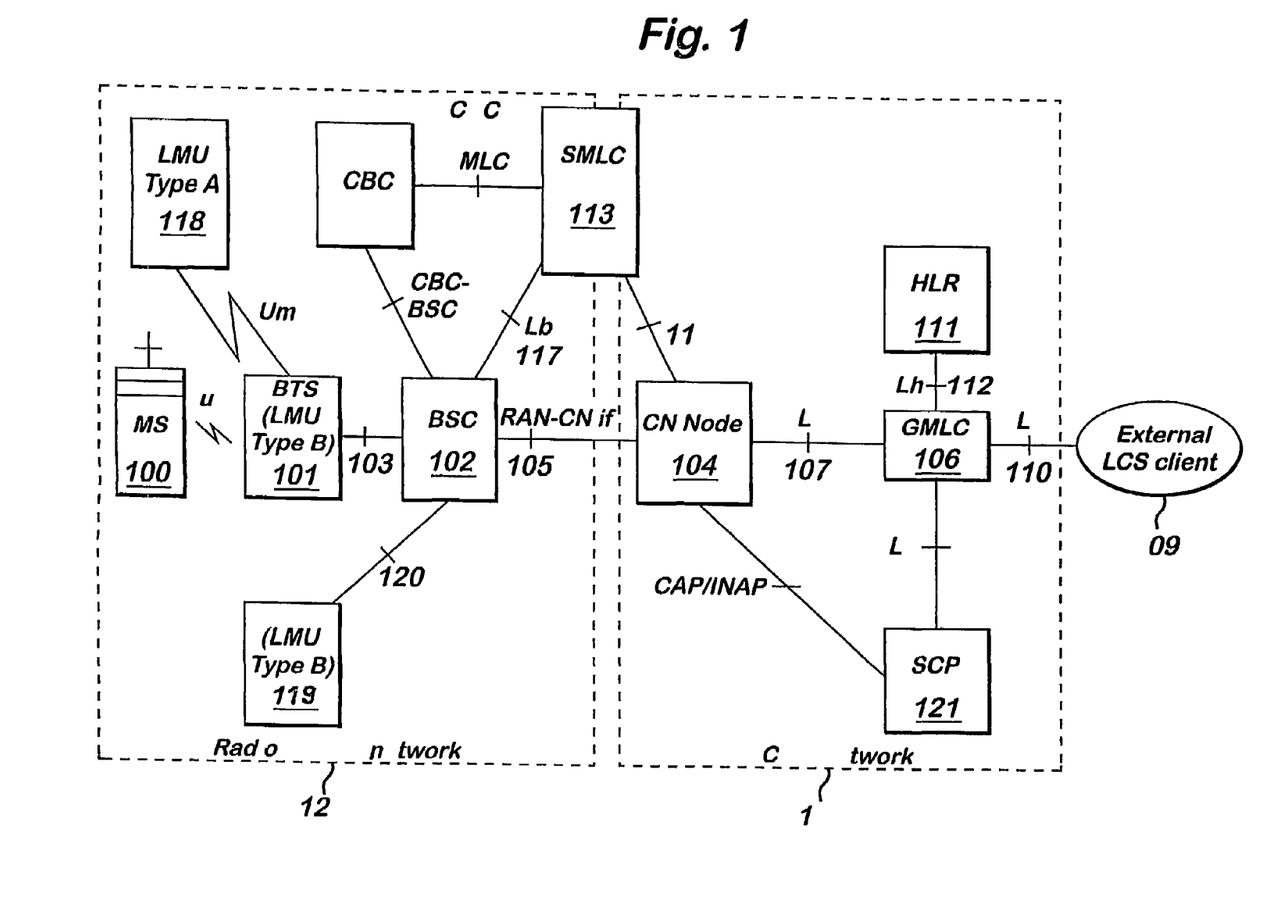
FIG. 1 illustrates a generic LCS logical architecture

Location services (LCS) is logically implemented on the GSM/UMTS structure by the addition of one network node. This is the mobile location centre (MLC). A general LCS logical architecture is illustrated in FIG. 1.

A mobile station (MS) 100 can be a mobile telephone or a laptop computer which has a radio modem or a fax adapted for radio access. The term MS is used here as an example of mobile user equipment (UE). This communicates with the base transceiver station (BTS) 101 over the radio interface ($U_M$ Interface). The term BTS is used here also to cover the UMTS terrestrial radio access network (UTRAN) corresponding to the network element node B. The BTS is equipment for transmission and reception of signals and may additionally include ciphering equipment. The BTS in turn communicates with a base station controller (BSC) 102 via link 103 (A Bis in GMS, Iub in UMTS). The term BSC is used here also to cover the UTRAN corresponding network element which is the radio network controller (RNC). The BSC sets up the radio channels for signalling and traffic to the core-network (CN) node 104 via link 105. This forms part of the core-network 125.

The CN node can be either a mobile switching centre (MSC) or serving GPRS support node (SGSN) depending on the switching domain (circuit switched or packet switched). The CN node 104 is essentially a switching node having many functions. In particular, the CN node performs connection management, mobility management and authentication activities. In this example the CN node also contains the call control function and service switching functions defined by the IN/CAMEL architecture. However, in the package switched domain these before-mentioned CN node functions may be split to separate network elements. Each CN node can control a number of BSC which are referred to as being in an CN node service area. In general BTS's and BSC's together form the radio access network (RAN) 126, which is referred to as the base station sub-system (BSS) in GMS and UTRAN in UMTS.

The CN node 104 is connected to the gateway mobile location centre (GMLC) 106 via the $L_g$ interface 107 which contains functionality required to support LCS. In one PLMN there may be more than one GMLC. The GMLC is the first node an external LCS client accesses in a GSM PLMN.

An LCS client 109 is a logical functional entity that requires, from the LCS server function in the PLMN, location information for one or more target MS with a specified set of parameters such as quality of service (QoS). The LCS client may reside in an entity (including for example the MS), within the PLMN or in an entity external to the PLMN. An external LCS client 109 is shown by way of example only in FIG. 1 which communicates with the GMLC 106 via the $L_e$ interface 110.

In response to a location request from an LCS client, the GMLC may request routing information from the home location register (HLR) 111 of the system via the $L_h$ interface 112. The HLR is a database which allows a mobile subscriber to be permanently registered in the system. The HLR keeps track continuously of the location of a subscriber or MS i.e. via the Visitor Location Register (VLR) or SGSN. In addition to the HLR, each CN node 104 is associated with a database containing details of subscribers temporarily in the service area of that CN node. In circuit switched domain this database is called Visitor Location Register (VLR), and in the packet switched domain the database is contained in the SGSN.

After performing registration authorisation the GMLC 106 sends positioning requests to and receives final location estimates from, the CN node in the service area in which the MS is currently located (or visiting).

The serving mobile location centre (SMLC) 113 contains functionality required to support LCS. In one PLMN there may be more than one SMLC 113. The SMLC 113 manages the overall coordination and scheduling of resources required to perform positioning of a mobile station. It also calculates the final location estimate and accuracy.

Two types of SMLC are possible. These are the Core Network (CN) based SMLC, which supports the $L_s$ interface 116 which is the interface between the serving MLC and CN node, and the Radio Access Network (RAN) based SMLC which supports the $L_b$ interface 117 between the SMLC 113 and the BSC 102. A CN based SMLC supports positioning of a target MS via signalling on the $L_s$ interface to the visited CN node. A RAN based SMLC supports positioning via signalling onto the $L_b$ interface. In UMTS, SMLC functionality is contained in the BSC 102, i.e. Radio Network Controller (RNC).

The SMLC can control a number of location measurement units (LMU)'s for the purpose of obtaining radio interface measurements to locate or help locate MS subscribers in the area that it serves.

In order to provide location information about the MS 100, the MS may be involved in various positioning procedures. It may also calculate its own location estimate and accuracy by means of various MS based position calculating methods.

As mobile positioning requirements and methods evolve quickly more and more positioning methods become available. These methods have different characteristics for example the required position calculation processing power; accuracy of the location estimation; and the time which is used for collecting parameters and calculating the position estimates.

The processing power needed for position calculation is dependent on the algorithms characteristic to each calculating method and the number of used parameters. As a result these parameters may themselves need to be calculated and may be dependent upon other factors dependent upon the communication system. For example processing power needed for a calculation based on one calculation method may be significantly lower than the one based on a more complicated method.

Similarly, location estimation accuracy is dependent upon the used calculation method. The estimation based on one method may not be as accurate as an estimation based on another method. Likewise the response time (i.e. the time difference between the request being made for the location and the delivered location) varies greatly between different methods. In some cases all the parameters needed for position estimation are available in the calculating function. However in some methods parameters are obtained after complicated measurements in different network elements have been carried out.

Below are described some of the many location calculation methods which may be used to calculate the geographically location of a MS in a communication system. The list is not exhaustive but is set out for the purposes of illustration only and the present invention is not limited to use with these calculating methods.

Calculating Methods

1. Cell ID (CI)

Figure 2:
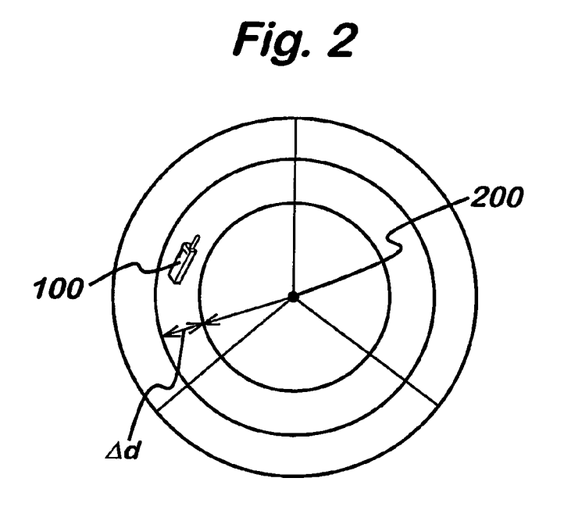
FIG. 2 illustrates a cell ID calculating method

The PLMN can identify the cell where the mobile is travelling at any moment (if the MS is turned on). This CELL ID (CI) can be transferred to the location calculation function which converts CI to Cell Centre Co-ordinates. This conversion can be based on information retrieved from a network planning tool. The centre 200 of the host BTS cell area is thus used as the location of the MS. This is illustrated in FIG. 2.

2. CI+Timing Advance (TA)

In GSM the delay between the MS and serving BTS must be known to avoid overlapping time slots. This delay is referred to as timing advance (TA). The TA value can be used to estimate the distance between the MS and serving BTS. Effectively the time difference of the actual arrival of a signal from a MS and the allocated time at which it should have arrived is utilised. The TA values are measured by the BTS and the TA value reported to the MS has the range between 0–63. One TA measurement value unit thus represents a distance of about 550 metres and thus the TA value can represent the distances between 0 and 35 kilometres. The TA value and co-ordinates of the cell can be used to estimate the location of the MS.

3. CI+TA+RX

This is similar to the CI+TA method above-described but the location estimate is enhanced with MS power level measurements from neighbouring BTS's.

4. Enhanced-Observed Time Difference (E-OTD)

Figure 3:
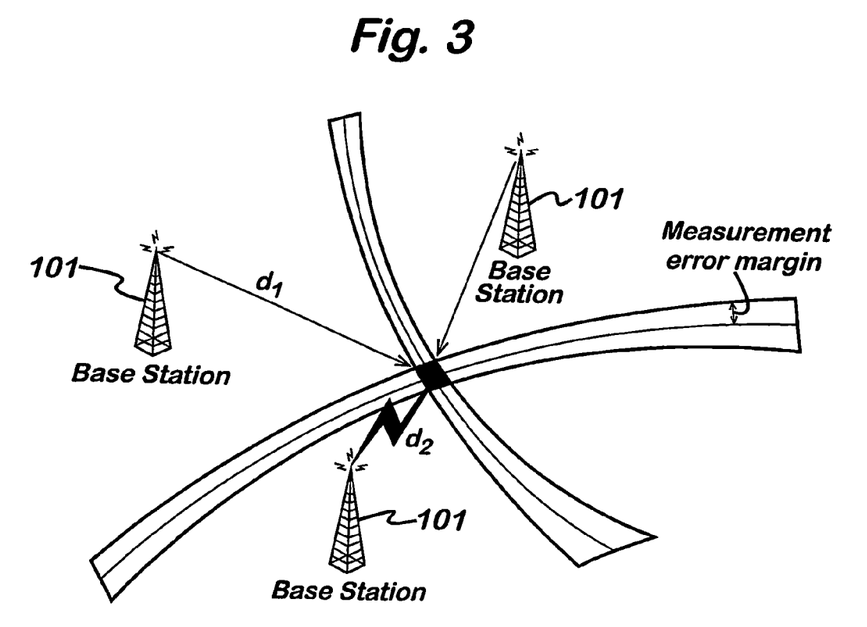
FIG. 3 illustrates an enhanced observed time difference calculating method

In the Enhanced-Observed Time Difference (E-OTD) location method the MS measures the observed time difference (OTD) between the arrival of bursts from the serving and neighbouring base stations. The propagation time difference between two BTS's determines a hyperbola which is the curve of possible locations for an MS observing a constant time difference value between two base stations at known positions. This is illustrated in FIG. 3. When there are at least two such hyperbolas available (i.e. there are three serving and two neighbouring BTS's) the location estimate can be found at the intersection of the hyperbolas. If more E-OTD values are available then the possible location area can be more accurately deduced.

5. Assisted Global Positioning System (A-GPS)

The Assisted Global Positioning System (GPS) method refers to any one of the several variants that make use of GPS signals or additional signals derived from GPS signals in order to calculate MS positions. These variants give rise to a range of optional information flows between the MS and the network. One dimension of variation is whether "assistance data" is required irrespective of where position calculation is performed. Examples of assistance data include differential GPS data; list of satellites in view based on approximate MS positions etc. The assistance data is provided by the network to the receiver. The receiver can use this not only for more accurate location estimation but also for receiver sensitivity enhancement.

Tables 1 to 5 summarise the characteristics of the various location calculation methods mentioned above.

TABLE 1

| Cell ID | |
|---|---|
| Time | CI method response time is very quick |
| Accuracy | Accuracy is dependent on Cell size. In case of micro or pico cells the accuracy is very good. However in rural and suburban environments accuracy may be very poor. |
| Processing power: | Low |
| Availability: | Works with legacy phones |

TABLE 2

| CI + TA | |
|---|---|
| Time | Response time is very quick (similar to pure CI) |
| Accuracy | Enhances CI-method in average/big cells. However in small cell sizes no advantage is given. |
| Processing power: | Slightly higher than CI-method |
| Availability: | Works with legacy phones |

TABLE 3

| CI + TA + Rx | |
|---|---|
| Time | Response time slightly longer than CI + TA |
| Accuracy | Gives better accuracy than CI + TA when multiple power levels can be measured without multipath propagation effects. Otherwise no significant enhancement. |
| Processing power: | Higher than CI + TA |
| Availability: | Works with legacy phones |

TABLE 4

| E-0TD | |
|---|---|
| Time | Response time longer than in CI + TA + Rx |
| Accuracy | If multiple neighbouring BTS's can be measured without multipath propagation the accuracy is relatively high (< 100 m). However, if measurements from less than 3 BTS's are available E-OTD can not be used. Additionally multipath propagation affects accuracy. |
| Processing power: | Same or higher than CI + TA + RX |
| Availability: | Needs E-OTD hand-sets and hardware upgrades to network elements |

TABLE 5

| A-GPS (MS based) | |
|---|---|
| Time | About the same as CI – TA – Rx |
| Accuracy | Outdoors without multipath propagation the accuracy is very goods (< 30 m) . However, if line of sight is not available at least to four satellites the accuracy is reduced. In some cases accuracy gets better over a period of time. |
| Processing power: | Does not need any processing from the network because location is calculated in the MS |
| Availability: | Needs A-GPS hand-sets and HW upgrades to network elements. |

As can be seen the accuracy of the location calculation may differ very much depending on the environment. For example in rural environments where the cell seize is relatively large and there are no big obstacles which interfere with the line-of-sight or cause multipath propagation, A-GPS or E-OTD gives the best results. However, in urban city centres where cell sizes are very small and buildings cause fading, reflections and shield GPS satellites or neighbouring BTS's Cell ID quite often gives best results.

The location measurement units (LMU) (shown in FIG. 1) may make radio measurements to support one or more of these positioning measurements.

Two types of LMU are defined. Type A LMU 118 which is accessed over the air interface ($U_m$) and type B LMU 119 which is accessed over the interface 120 to the BSC 102.

A type A LMU is accessed exclusively over the GSM air interface ($U_m$) interface. There is no wired connection to any other network element. A type A LMU has a serving BTS and BSC that provides signalling access to a controlling SMLC. With a CN based SMLC a type A LMU also has a serving CN node.

A type B LMU is accessed over the interface 120 from a BSC. The LMU may be either a stand-alone network element addressed using some pseudo-cell ID or connected to, or integrated in, a BTS. Signalling to a type B LMU is by means of messages routed through the controlling BSC for a BSS based SMLC or messages routed through a controlling BSC and CN for a CN based SMLC.

The requested accuracy and response time must be defined. This represents a service level requirement or other required standard relating to a characteristic of a calculation method. As such the service level requirement represents a minimum standard requirement which certain identified characteristics of the calculation method must satisfy. For example the calculation method should provide an accuracy which is at least as good as a required level of accuracy or within a period of time which is not longer than a specified maximum. These service level requirements are quality of service (QoS) requirements. The QoS is thus usually required for a location request. The QoS requirements can be explicitly given within a location request (for example with an MS originating request). Alternatively the QoS can be implicitly derived from the requested service type or the service request originator. As a further alternative the QoS may not be requested at all (for example in emergency calls). In these cases it is very important to have very accurate location estimates which may be provided over relatively longer period of time. This is in contrast with some commercial applications which require very fast response times but can tolerate poor accuracy.

In order to prevent unnecessary processing power being used or an unduly long response time being required a dynamic location estimator controller (DLEC) function is provided according to embodiments of the present invention. The purposes of this function is to dynamically select the most suitable location calculating method. This will be the calculating method which is good enough to fulfil service level requirements (i.e. accuracy or time taken) and which is the most convenient method at that point in time to make the calculation. The DLEC function additionally provides a way in which the location of the MS may be calculated over a period of time allowing the estimation of the location to become more accurate as more and more location estimates are calculated by various different calculating methods.

In order to achieve this the DLEC apparatus priorities the various possible location calculating methods into an execution order which is a sequence in which the calculating methods should be executed to calculate the location of the mobile user terminal. This sequence is changed dynamically in response to system parameters such as the time of day or available processing power so that as changes in the system occur the most appropriate calculating method can be used. Various system parameters can be used to control the re-ordering of the sequence in which the calculating methods are executed. Some examples of these are the quality of service required, so that when a highly accurate estimate of the location is required those methods which provide an highly accurate estimate are executed first, details of a subscriber associated with the mobile user terminal, so that subscribers who pay more can obtain a more accurate location estimate. Or the time of day when the location request is made so that during peak times when capacity in certain portions of the communication system are predicted to be very busy calculating method using functionality in other portions of the communication system can be utilised. In this respect it should be noted that the methods are differentiated not only by the algorithms and parameters which are used to calculate the location but also the location of the calculating function in the communication system. Therefore the priority list may in fact include duplicates of the calculating method but which are executed in different physical network elements.

Figure 4:
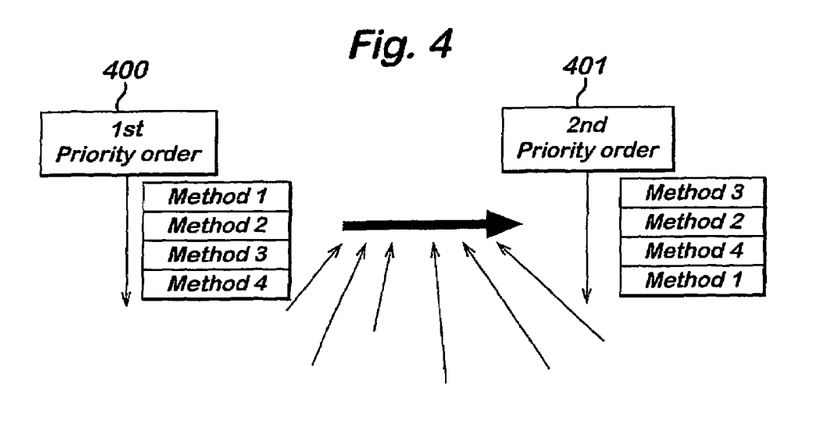
FIG. 4 illustrates the re-ordering of an execution sequence

FIG. 4 illustrates how the sequence in which the calculating methods are executed is dynamically re-ordered per location request. The methods labelled 1 to 4 represent the possible-calculating methods which are available. It will be understood that more or less than four calculating methods could be used and that these methods represent not just different algorithms but cover similar calculating mechanisms provided in different network elements. These are arranged into a sequence represented by a first priority order 400. This identifies a default sequence in which the methods will be executed in order to calculate a location of a mobile station. Various system parameters are then checked and in response to these a second priority order 401 formed by re-ordering the first priority order is formed. This second priority order represents a new sequence in which the location calculating methods should be executed in order to calculate the MS location. The systems parameters are identified in FIG. 4 as the QoS, subscriber details, type of location request, input from prior calculating process steps, the service and whether there is currently a queue for other location requests. It will be understood that the present invention is not limited to these system parameters but rather they are shown for illustrative reasons only. Further system parameters could be used and more or less service parameters could be used to effect the re-ordering of the sequence.

For example the CI method can be used as the first alternative (Method 1) and the E-OTD as the second (Method 2). Methods 3 and 4 as shown in the first priority order 400 could both be A-GPS methods but Method 3 could be calculated using functionality in the MS whilst Method 4 could be calculated using functionality in the LMU. These methods are executable in the default sequence 400. However this default order can be changed dynamically either per location request or for all requests. For example if the calculation process indicates that a large amount of E-OTD calculation capacity is unused in the system the priority order can be re-ordered so that all requests exceeding a pre-determined QoS level are routed to E-OTD calculating methods. In this way efficient use of calculating capacity is made. For example in FIG. 4 the new sequence in which the methods are executable is Method 3, 2, 4 followed by 1.

Figure 5:
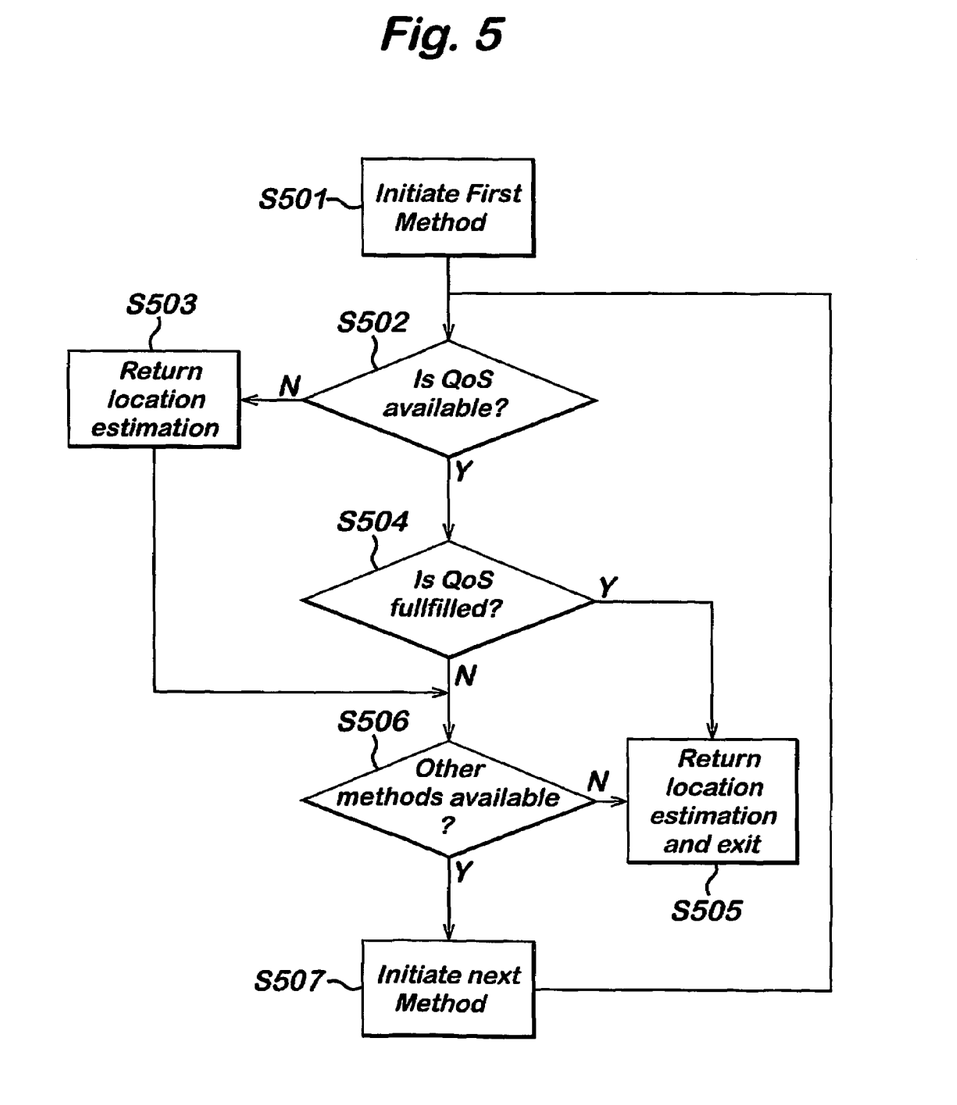
FIG. 5 illustrates the location calculating process

FIG. 5 illustrates a flow diagram showing the location calculating process. When a request for the location of an MS to be calculated is received the default sequence (or priority order) of the various available calculating methods is determined. Thereafter system parameters are checked and in response to these the default sequence is re-ordered to formulate a new sequence representing the order of priority in which the calculation methods are executable. Once this new sequence is established calculation and/or any requests for additional information are started by initiating the method which is foremost in the sequence in which the calculating methods should be executed. This is termed as the first method and at step S501 this method is initiated. At step S502 the process determines whether the quality of service requirements are known. If they are not then the location estimate calculated by the first method is returned as the location estimate. This would be the result of Method 3 as illustrated in FIG. 4. If the quality of service required is known then the question is asked at step S504 whether the quality of service is fulfilled by the selected calculating method. This may be done either by comparing some characteristics associated with the selected method with the QoS specified or by carrying out the location calculation according to the method and comparing the result with the QoS requirements. If the service level requirements are fulfilled then the result calculated by the foremost calculating method (in this example the Method 3) is returned as the location estimate and no further steps are required. This is represented by step S505. If the quality of service at step S504 is determined as not being fulfilled the next step is to determine whether any further calculating methods are available. This is illustrated as step S506. If at least one further method is available and so far unused the foremost method is initiated at step S507. The next method executed is the calculating method which is next in the new sequence identified as being the order in which the calculating methods should be executed. If further methods are not available then the location estimate so far calculated is provided as the best guess for the location of the mobile station and the process is completed (step S505).

The purpose of repeating the calculating method steps is to enhance the estimation of the mobile location. This is achieved either by executing different location methods or by executing similar location methods using more accurate parameters.

Figure 6:
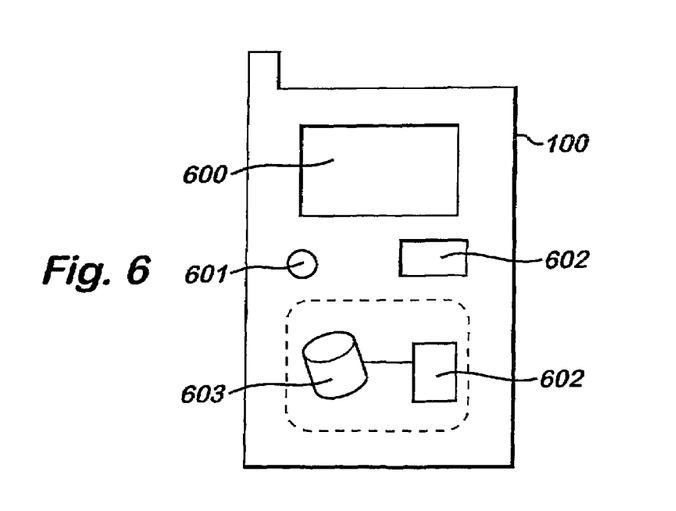
FIG. 6 illustrates an MS

The execution order can be stored in the MS or in any other suitable network element. For example, as shown in FIG. 6, MS 100 contains a user display 600 and buttons 601, 602 which together with other buttons, microphone and earphone (not shown) comprise a user interface. In FIG. 6 the MS 100 has been cut away to show a data store 603 and control apparatus 604 therein.

The data store 603 stores the various location calculating methods which are usable to calculate the MS location. This includes the algorithms required according to each calculating method and details of any parameters used in the calculation. Alternatively the data store can include details of how these parameters may be calculated or obtained.

Figure 7:
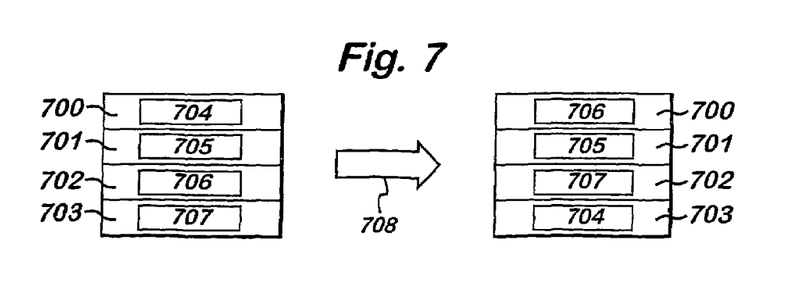
FIG. 7 illustrates data stored in an MS

The data store also stores a plurality of data fields, 700, 701, 702, 703. These are shown in more detail in FIG. 7. These data fields indicate the order in which the calculating methods are executable. This is done by storing data entries 704, 705, 706 and 707 each of which is associated with a particular one of the available calculating methods in the data fields. By reordering S708, the entries in the data fields the order of priority in which the calculating method should be executed is indicated. It will be understood that the reordering of the calculating method according to the present invention is not limited to the above described method.

Figure 8:
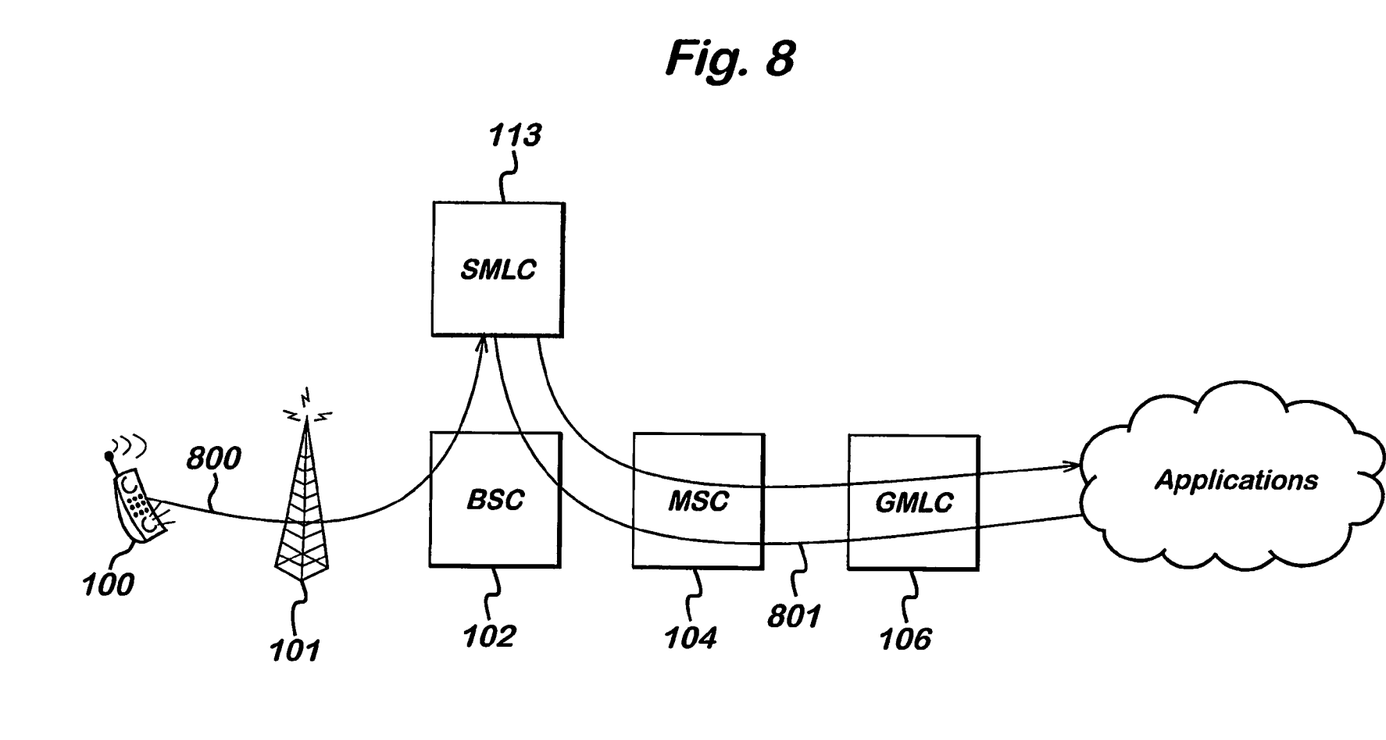
FIG. 8 illustrates the position of DLEC functionality

FIG. 8 illustrates portions of the generic location services system architecture of FIG. 1 showing how the DLEC functionality can be provided in the SMLC 113. The request for the location of the mobile station 100 can be originated either from the MS, such as for example a user operating the user equipment, or from a service provider acting as an external LCS client 109. It will be understood that the location request can be originated at other elements. In FIG. 8 this is illustrated by the "applications" outside the communication network. If the location request is originated from the MS the request message 800 is routed to the SMLC via the BTS and BSC. The message can include details of the QoS required. As an alternative the location request may be triggered automatically in the case of an emergency call being made or may be specifically requested by a user of the user equipment by inputting the request via a user interface of the UE. In the case of a location request being triggered from an emergency call an absolute QoS requirement is not necessary since the best available method will be used. If the location request comes from the service provider network external to the communication network the location request is received in the GMLC which does a basic service authentication. The GMLC may add QoS specifications as defined for the service and send the location request on to the SMLC as request message 601. This is done via the MSC and possibly the BSC. Alternatively QoS requirements may be included in the location request signal received at the GMLC.

When receiving the location request signal 800 or 801 from the mobile station or external LCS client respectively the SMLC selects the most suitable location calculating method. Depending upon the method selected the SMLC may request additional measurement information from the mobile station which information is required to enable the location to be calculated. After the SMLC has all of the required parameters needed for the selected calculation method the location of the MS is calculated according to that method.

In FIG. 8 the DLEC functionality is located in the SMLC. If the SMLC is integrated with any other component in the communication system, for example with the BSC, information peculiar to that network element can be used to calculate the priority sequence in which the location method should be executed. For example when the SMLC is integrated to the BSC the cell size will be implicitly known. It would thus be feasible to use that information to forecast whether a QoS requirement will be fulfilled.

Figure 9:
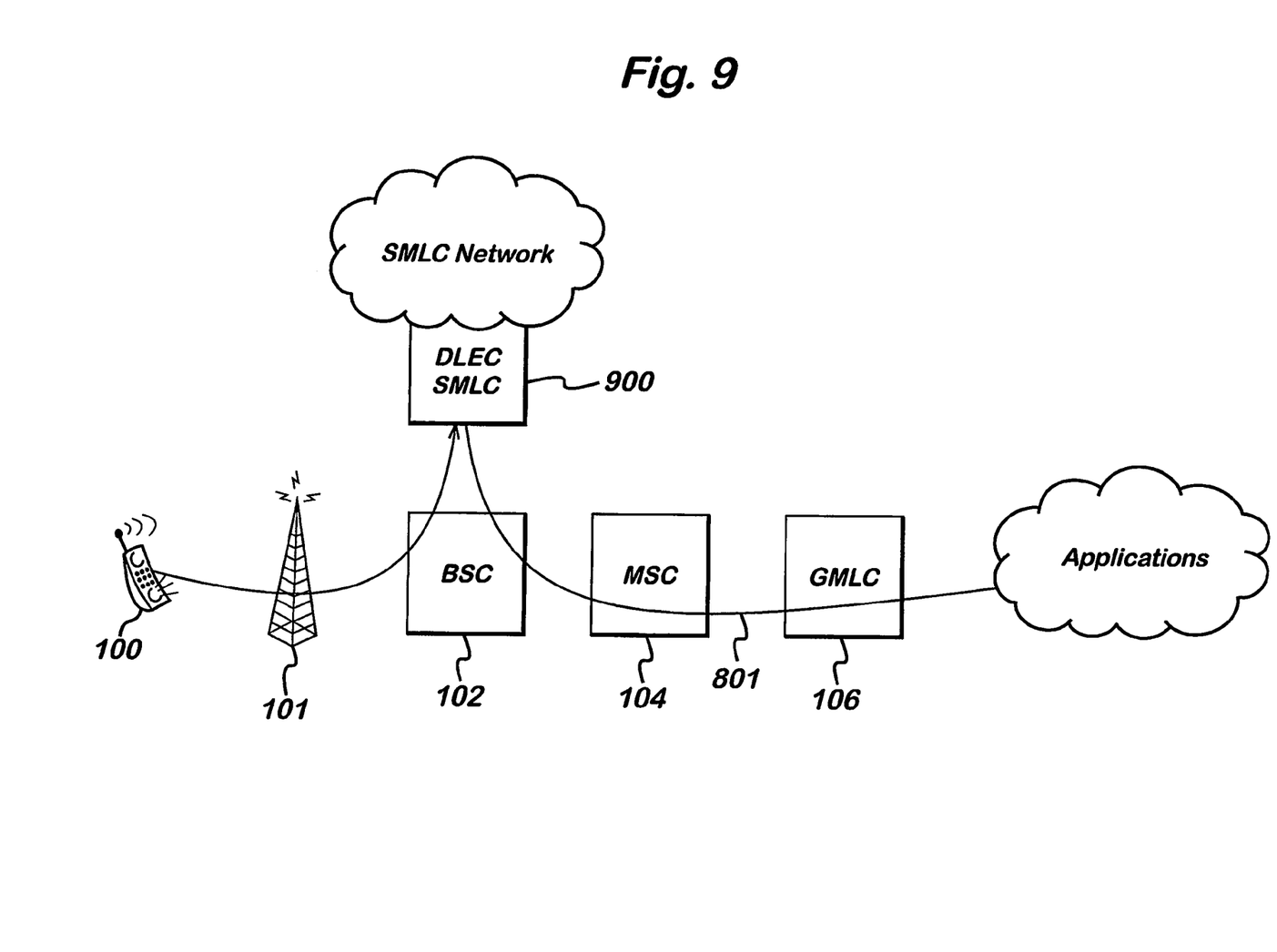
FIG. 9 illustrates an alternative position of the DLEC functionality

As an alternative to the configuration shown in FIG. 6 in embodiments of the present invention multiple stand alone SMLCs can be used in a communication network and networked together. This is illustrated in FIG. 9. In such an arrangement it is possible to use the DLEC as a centralised resource allocation function shared by all of the SMLCs in the network. In such a system all location requests are routed to this centralised DLEC SMLC which is updated with availability, load, capability and other system parameter information for every SMLC in the network. This information is stored in the DLEC SMLC. The DLEC SMLC evaluates the most suitable method and the most suitable stand alone SMLC to calculate the position. In this way embodiments of the present invention provide a heterogeneous SMLC network in which individual SMLCs have different capability sets.

Embodiments of the present invention thus provide a method for calculating the location of a MS in a communication network. This is achieved by providing a default execution order in which the various available calculating methods for calculating the position of the MS are executed in order to calculate the MS location. This default execution order is re-ordered using various selection attributes which represent parameters of the communication system. These selection attributes can include the time of day, location area or cell, radio network configuration at the cell and surrounding cells (i.e. repeaters, line of sight information, cell size and beam width), available calculation capacity and SMLC load, request originator and user equipment characteristics. It will be understood that this list is not exhaustive but rather any characteristic of the network which could impact upon the efficiency of the LCS resources could be used as a system parameter variable. The default execution order may also be re-ordered as the position calculation proceeds. This enables the output location estimates to effect the execution order of subsequently applied methods. Similarly a previously attempted method can be attempted repeatedly. This provides a dynamic location calculated method which can be responsive rapidly to changes in the communication network so that location service resources are efficiently utilised.

Once a new execution order has been established the calculating methods are executed according to that order one by one until QoS requirements are fulfilled or the available time expires or all calculation methods have been used.

Embodiments of the present invention provide a dynamic location estimation controller which can be located in the SMLC. Alternatively the DLEC may be a centralised functionality which can communicate with several SMLCs.

It is also noted that while the above describes preferred embodiments of the present invention, various modifications may be made without departing scope of the present invention.

The invention claimed is:

1. A method for calculating the location of a mobile user terminal in a wireless communication system, comprising the steps of:
   identifying a default sequence in which a plurality of location calculating methods should be executed to calculate said location;
   forming a new sequence by reordering said default sequence responsive to at least one system parameter; and
   executing at least one of said calculating methods in accordance with the new sequence to thereby calculate said location.

2. The method as claimed in claim 1 further comprising:
   if a service level requirement is known, executing the one of said plurality of calculating methods which, of those calculating methods which satisfy the service level requirement, is foremost in the new sequence.

3. The method as claimed in claim 1 further comprising:
   if a service level requirement is not known, executing the calculating methods sequentially in the order of the new sequence.

4. The method as claimed in claim 3 further comprising:
   after a first calculating method in the new sequence is executed providing an initial location estimate based upon the location calculated by that first calculating method; and
   executing at least one further calculating method in the new sequence and based upon the location so calculated enhancing the initial location estimate.

5. The method as claimed in claim 3 further comprising:
   if the service level requirement becomes known subsequent to at least one of the calculating methods being executed, checking whether a calculating method so far executed satisfies the service level requirement, and if it does providing the location estimate calculated by that calculating method as the location of the user terminal.

6. The method as claimed in claim 5 further comprising:
   if the calculating method so far executed does not satisfy the service level requirement executing the one of said plurality of calculating methods of those calculating methods which satisfy the service level requirement which is foremost in the new sequence.

7. The method as claimed in claim 1 further comprising:
   subsequent to forming the new sequence and thereafter executing a calculating method, reordering the new sequence responsive to at least one system parameter thereby forming an updated sequence; and
   executing at least one calculating method in accordance with the updated execution order.

8. The method as claimed in claim 1 further comprising:
   after each calculating method is executed, updating the new sequence by reordering responsive to at least one system parameter; and
   executing at least one calculating method in accordance with the updated sequence said updated sequence thereafter becoming the new sequence.

9. The method as claimed in claim 1 further comprising:
   once a calculation method has been executed which satisfies a service level requirement stopping execution of further calculation methods.

10. The method as claimed in claim 1 further comprising:
    generating a location request signal at the user terminal and initiating calculation of the location of the user terminal in response to the generated request signal.

11. The method as claimed in claim 1 further comprising:
    generating a location request signal at a node in the communication system and initiating calculation of the location of the user terminal location in response thereto.

12. The method as claimed in claim 1 wherein said at least one system parameter is the time of day and/or the available processing power and/or a location estimating queue length and/or the location area of a subscriber of the user terminal and/or the initiator of the request for a location estimate and/or the number of neighbouring base transceiver stations to the cell in which the user terminal is located and/or a required quality of service.

13. The method as claimed in claim 2 where said service level requirement comprises a required quality of service.

14. The method as claimed in claim 13 wherein said quality of service comprises the time taken to calculate the location estimate and/or the accuracy of the location estimate and/or the processing power required by the location calculating method to calculate the location estimate and/or the availability of the location calculating method and/or the location of the functionality in the system which executes the location calculating method.

15. Apparatus arranged to calculate the location of a mobile user terminal in a communication system comprising:
    means to access a data store holding a plurality of calculating methods;
    means for receiving a signal identifying at least one system parameter and in response thereto reordering an identified default sequence of said plurality of calculating methods to thereby form a new sequence; and means for executing at least one of said calculating methods in accordance with said new sequence to thereby calculate the location of the user terminal.

16. The apparatus as claimed in claim 15, further comprising:
means for receiving a location request signal and in response thereto initiating calculation of the user terminal location.

17. The apparatus as claimed in claim 16, wherein the location request signal is generated in a network element of the communication system.

18. The apparatus as claimed in claim 16, wherein the location request signal is generated in the user equipment in response to a user requesting the user equipment location via a user interface of the user equipment.

19. The apparatus as claimed in claim 15, further comprising:
a memory store including a plurality of data fields arranged in an order which indicates an execution sequence;
a plurality of data entries each corresponding to a respective one of a plurality of location calculating methods; and wherein a respective one of said data entries is held in a respective one of said data fields thereby indicating the execution sequence in which the plurality of location calculating methods should be executed.

20. Apparatus as claimed in claim 19 wherein:
said identified default sequence comprises an initial order of said data entries stored in said data field and said new sequence comprises a further order of said data entries held in said data fields.

21. Apparatus as claimed in claim 20 wherein:
said means for receiving comprises means for reordering which data entries are held in the data field.

22. Apparatus as claimed in claim 15 wherein said apparatus comprises a mobile user terminal.

23. Apparatus as claimed in claim 15 wherein said apparatus comprises a dynamic location estimator controller.

24. Apparatus as claimed in claim 15 wherein said apparatus is in the serving mobile location centre of the communication system.

* * * * *